(12) United States Patent
Lutke et al.

(10) Patent No.: US 8,459,591 B2
(45) Date of Patent: Jun. 11, 2013

(54) METHODS AND APPARATUS FOR AERIAL RECOVERY OF FLYING APPARATUS

(75) Inventors: Kevin Reed Lutke, Huntington Beach, CA (US); Aaron J. Kutzmann, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/465,220

(22) Filed: May 7, 2012

(65) Prior Publication Data
US 2012/0211588 A1 Aug. 23, 2012

Related U.S. Application Data

(62) Division of application No. 12/120,065, filed on May 13, 2008, now Pat. No. 8,191,828.

(51) Int. Cl.
*B64F 1/04* (2006.01)

(52) U.S. Cl.
USPC ........................................................ 244/110 F

(58) Field of Classification Search
USPC ........... 224/110 F, 110 G, 1 TD, 3, 63, 135 A
See application file for complete search history.

(56) References Cited

U.S. PATENT DOCUMENTS

| | | |
|---|---|---|
| 1,687,000 A | 10/1928 | Abreu |
| 1,869,506 A | 8/1932 | Richardson |
| 2,488,050 A | 11/1949 | Brodie |
| 2,585,030 A | 2/1952 | Nosker |
| 3,520,502 A | 7/1970 | Smethers |
| 3,567,156 A | 3/1971 | Bauer |
| 4,256,012 A | 3/1981 | Cowart et al. |
| 4,890,751 A | 1/1990 | Opdahl |
| 5,054,717 A | 10/1991 | Taylor |

OTHER PUBLICATIONS

USPTO non-final office action dated Nov. 25, 2011 regarding U.S. Appl. No. 12/120,065, 12 Pages.
USPTO notice of allowance dated Apr. 12, 2012 regarding U.S. Appl. No. 12/120,065, 7 Pages.
Response to office action dated Feb. 1, 2012 regarding U.S. Appl. No. 12/120,065, 17 Pages.
Response to restriction requirement dated Sep. 21, 2011 regarding U.S. Appl. No. 12/120,065, 6 Pages.
USPTO restriction requirement dated Aug. 24, 2011 regarding U.S. Appl. No. 12/120,065, 6 Pages.

*Primary Examiner* — Tien Dinh
(74) *Attorney, Agent, or Firm* — Yee & Associates, P.C.

(57) ABSTRACT

Methods and systems are provided which may allow a first vehicle to recover a second air vehicle while both are moving. The first vehicle and the second air vehicle may be traveling at different velocities. An attachment member of the second air vehicle may attach to a recovery member of the first vehicle while the first vehicle and the second air vehicle are traveling at different velocities. The recovery member attached to the second air vehicle may move relative to and along an exterior surface of the first vehicle in a direction substantially parallel to a direction of travel of the first vehicle.

16 Claims, 11 Drawing Sheets

METHODS AND APPARATUS FOR AERIAL RECOVERY OF FLYING APPARATUS

This application is a divisional of application Ser. No. 12/120,065, filed May 13, 2008, status allowed.

BACKGROUND

For many reconnaissance aircraft, higher altitude may be used to reduce the chance of detection and increase survivability. This may be at the expense of image quality or sensor resolution. Moreover, total sensor range may limit the line of site to relatively vertical angles, which may make viewing targets covered by natural or man made covers difficult. One solution is to deploy sensors on smaller aircraft to a lower altitude. This may allow the smaller aircraft to increase image/sensor quality by reduced distance to target, and their lower altitude may allow for lines of sight not achievable by a larger aircraft that must maintain larger battle-space awareness. Smaller aircraft however may not have the velocity or the range to reach the target of interest, and may need to be deployed by another vehicle, such as a mother-ship aircraft, a ground vehicle, a ship, or another type of vehicle. These smaller aircraft may not have the endurance or range to return to base when their mission is completed. Therefore, these smaller aircraft may need to be disposed or recovered at the end of their mission. Recovery may be a more attractive option, as it may prevent sensitive technology from falling into enemy hands, may allow commanders to operate the system independent of supply chains, and may offer lower lifecycle cost.

However, there may be many problems involved with having daughter aircraft recovered by a mother-ship aircraft, or another type of vehicle. For instance, the daughter aircraft and the mother-ship aircraft or other type of vehicle may operate in different velocity regimes. The landing of an unmanned aircraft vehicle or another type of aircraft vehicle onto the mother-ship aircraft or other type of vehicle may drive weight and inefficiencies into the structure, payload, and other systems. If the mother-ship or other type of vehicle is to continue its mission after the recovery of the daughter aircraft, the recovered aircraft may interfere with the launch of additional daughter aircraft or impose drag penalties on the mother-ship or other type of vehicle that may significantly hinder performance or mission capability. Additionally, other types of problems may be experienced.

A system and/or method is needed to decrease one or more problems associated with one or more of the existing systems and/or methods for recovering air vehicles.

SUMMARY

In one aspect of the disclosure, a first vehicle is provided for recovering a second air vehicle while the first vehicle and the second air vehicle are both moving. The first vehicle may comprise a moveable recovery member. The moveable recovery member may be disposed outside an exterior surface of the first vehicle. The moveable recovery member may attach to the second air vehicle and be moveable relative to and along the exterior surface of the first vehicle from a first position to a second position in a direction substantially parallel to a direction of travel of the first vehicle.

In another aspect of the disclosure, a method may be provided of a first vehicle recovering a second air vehicle in flight. In one step, the first vehicle and the second air vehicle may be traveling at different velocities. In another step, the second air vehicle may be attached to a recovery member of the first vehicle while the first vehicle and the second air vehicle are traveling at different velocities. In an additional step, the recovery member attached to the second air vehicle may be moved relative to and along an exterior surface of the first vehicle from a first position to a second position in a direction substantially parallel to a direction of travel of the first vehicle.

In still another aspect of the disclosure, a system may be provided for recovering an air vehicle during flight. The system may include a first air vehicle comprising a first fuselage and a moveable recovery member extending from a first exterior surface of the first fuselage. The moveable recovery member may be adapted to move relative to and along the first exterior surface of the first fuselage from a first exterior position to a second exterior position in a direction parallel to a direction of flight of the first air vehicle. The system may further include a second air vehicle comprising a second fuselage and an attachment member extending from a second exterior surface of the second fuselage. The attachment member may be adapted to, while both the first and second air vehicles are flying at different velocities, attach to the moveable recovery member. Whichever of the first and second air vehicles is flying faster may be adapted to move the moveable recovery member relative to and along the first exterior surface of the first fuselage from the first exterior position to the second exterior position in the direction parallel to the direction of flight of the first air vehicle. The moveable recovery member may be adapted to move from the second exterior position to a third interior position inside the first air vehicle in order to dispose the second air vehicle within the first air vehicle.

In yet another aspect of the disclosure, a method may be provided of a first air vehicle recovering a second air vehicle in flight. In one step, the second air vehicle may be attached to a recovery member of the first air vehicle while the first air vehicle and the second air vehicle are traveling in different directions. In another step, the recovery member attached to the second air vehicle may be moved relative to and along an exterior surface of the first air vehicle from a first position to a second position in a direction substantially parallel to a direction of travel of the first air vehicle.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
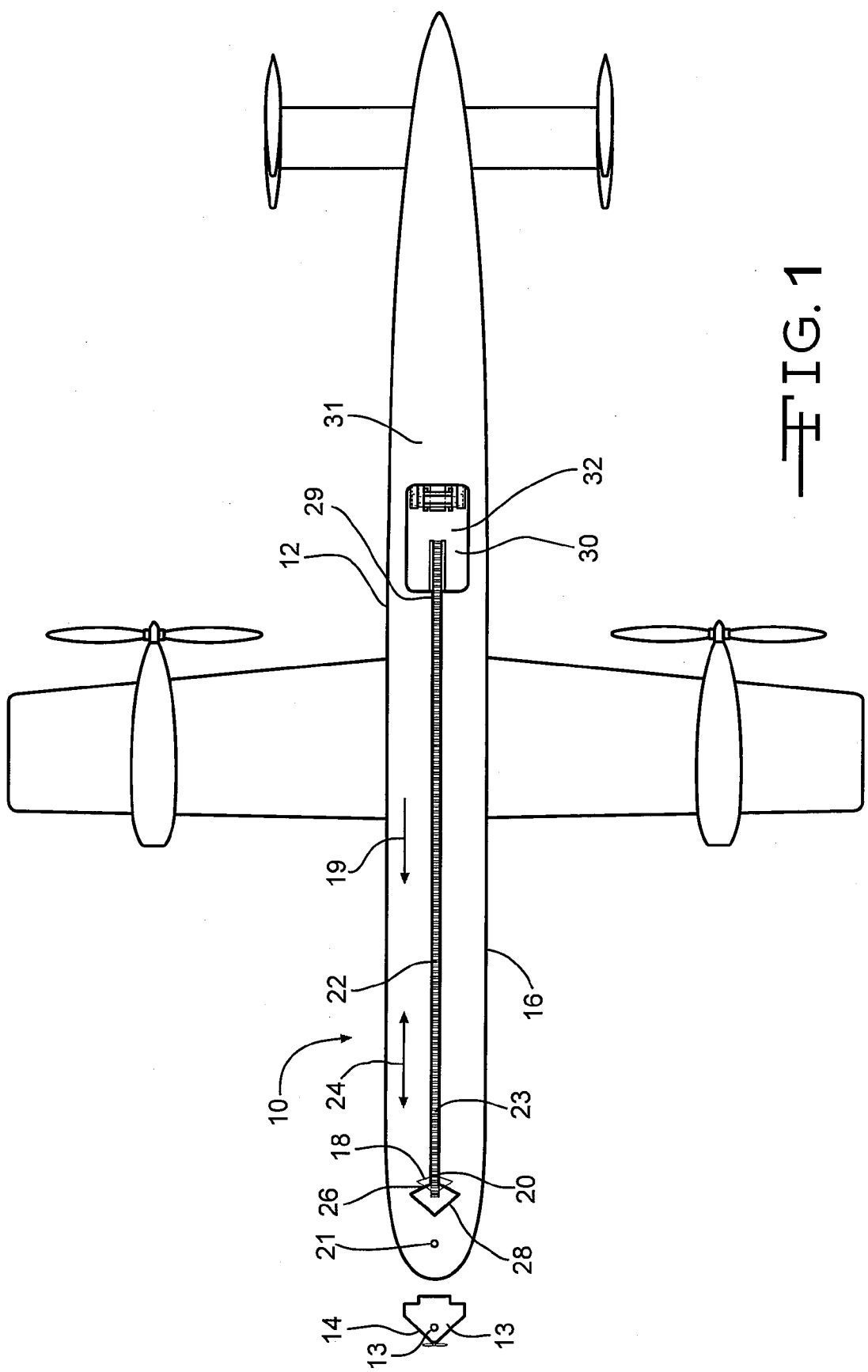
FIG. 1 shows a top side view of a system for a first vehicle to recover a second air vehicle while both the first vehicle and the second air vehicle are traveling.
Figure 2:
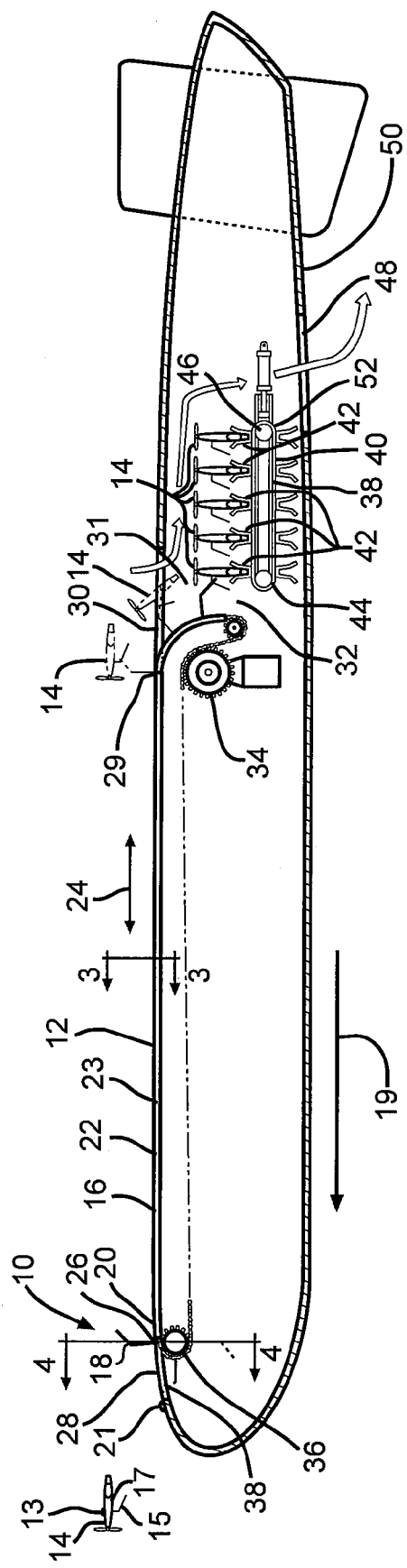
FIG. 2 shows a cut-away side view of the system of FIG. 1.

FIGS. 1 and 2 show top and cut-away side views of a system 10 for a first vehicle 12 to recover a second air vehicle 14 while both of the first vehicle 12 and the second air vehicle 14 are moving. The first vehicle 12 may comprise an aircraft, a ground vehicle, a ship, or another type of vehicle. One or more of the first vehicle 12 and the second air vehicle 14 may be unmanned. The first vehicle 12 may comprise a first fuselage 16 and a moveable recovery member 18 extending from a first, top, exterior surface 20 of the first fuselage 16. The moveable recovery member 18 may be trapeze-shaped, v-shaped, u-shaped, or looped-shaped. In other embodiments, the moveable recovery member 18 may be in varying shapes or sizes, and may be attached to varying surfaces of the first vehicle 12.

The second air vehicle 14 may comprise a second fuselage 13 and an attachment member 15 extending from a second exterior surface 17 of the second fuselage 13. The attachment member 15 may comprise a hook and/or other type of attachment device. The attachment member 15 may be adapted to, while both the first vehicle 12 and the second air vehicle 14 are traveling at different velocities, attach to the moveable recovery member 18 by hooking onto and/or otherwise attaching to moveable recovery member 18. One or more sensors 13A and 21 of the second air vehicle 14 and the first vehicle 12 may be used to align the attachment member 15 with the moveable recovery member 18 so that they may attach to one another during travel.

Figure 3:
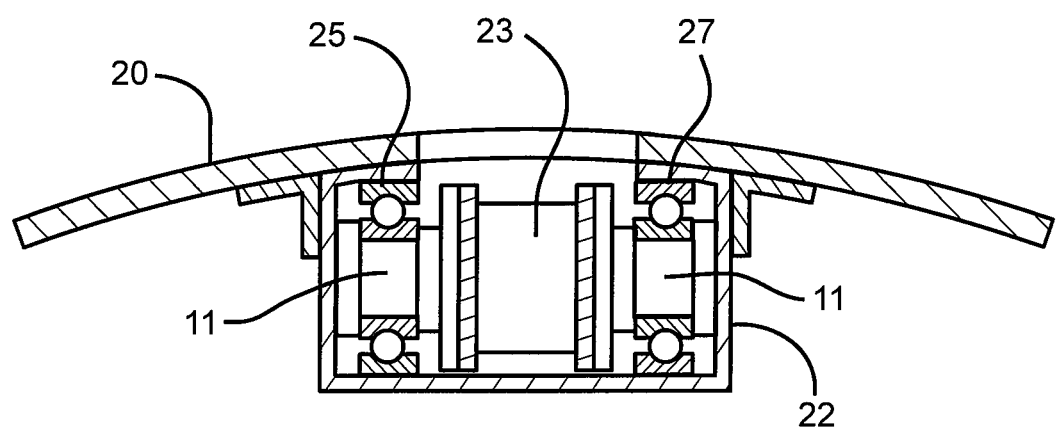
FIG. 3 shows a partial cross-section view through line 3-3 of FIG. 2 showing a moving surface moveably disposed within a track.
Figure 4:
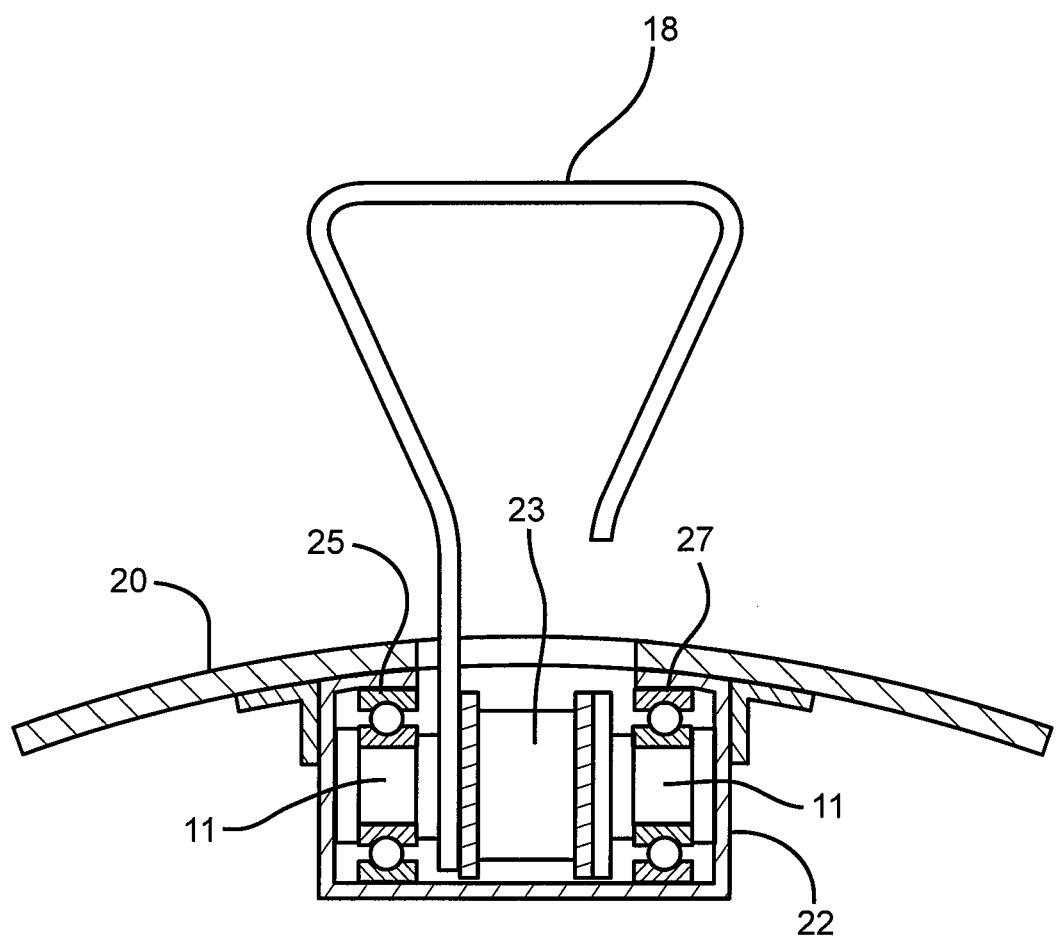
FIG. 4 shows a partial cross-section view through line 4-4 of FIG. 2 showing a moveable recovery member fixedly attached to a moving surface moveably disposed within a track.

An open, u-shaped track 22 may be fixedly attached to the first, top, exterior surface 20 of the first vehicle 12. In other embodiments, the track 22 may be in other shapes or sizes and may be attached to varying surfaces of the first vehicle 12. A moving surface 23 comprising a belt, chain, or other type of moving surface may be moveably disposed within and along the length of the track 22. FIG. 3 shows a partial cross-section view through line 3-3 of FIG. 2 showing the moving surface 23 moveably disposed within the track 22. One or more bearings 11 may assist the moving surface 23 in moving within the track 22. The moving surface 23 may be held within the u-shaped track 22 by flanges 25 and 27 disposed on top of the track 22. In other embodiments, the moving surface 23 may be disposed in and/or against varying types of structures. As shown in FIG. 4, the moveable recovery member 18 may be fixedly attached to the moving surface 23 so that the moveable recovery member 18 moves with the moving surface 23. FIG. 4 shows a partial cross-section view through line 4-4 of FIG. 2 showing the moveable recovery member 18 fixedly attached to the moving surface 23 which is moveably disposed within the track 22.

As shown in FIGS. 1-4, the open, u-shaped track 22, and the moving surface 23 disposed within and moving along the track 22, may both extend in a length-wise direction 24 parallel to and along the first, top, exterior surface 20 from a first position 26 to a second position 29 which may be substantially parallel to a direction 19 of travel of the first vehicle 12. The first position 26 may be disposed near the front 28 of the first vehicle 12, while the second position 29 may be disposed near the back 31 of the first vehicle 12. The track 22 may form a continuous loop extending from the first position 26 along the first, top, exterior surface 20 to the second position 29, to and through a recovery hatch 30 in the surface 20, downward into an interior cavity 32 of the first vehicle 12 to a third position 31, around first and second devices 34 and 36, and through a second hatch 38 in the exterior surface 20 back to the first position 26 in order to complete the loop.

The recovery and second hatches 30 and 38 may comprise openings in the exterior surface 20 which may be variably opened or closed. As a result of the different velocities of the first vehicle 12 and the second air vehicle 14 during attachment of the attachment member 15 with/to the moveable recovery member 18, whichever of the first vehicle 12 or the second air vehicle 14 is moving faster may force/drive the moving surface 23 attached to the moveable recovery member 18 to move along the track 22 from the first position 26 to the second position 29 and potentially to the third position 31. The deceleration of the moveable recovery member 18 as it moves from the first position 26 to the second position 29 and potentially to the third position 31 may create energy which may be stored by one or more of the first or second devices 34 and 36. The first and/or second devices 34 and 36 may comprise a generator/motor, and/or an energy storing device. The generator/motor may decelerate the second air vehicle 14 over some time/distance in order to reduce the instantaneous loads during attachment of the second air vehicle 14 with the moveable recovery member 18 of the first vehicle 12. The first and/or second devices 34 and 36 may further comprise differing types of driving devices which may be adapted to move/drive the moving surface 23 and attached moveable recovery member 18 from the third position 31 back to the first position 26, and from the second position 29 to the third position 31 if required. In other embodiments, one or more of the first and second devices 34 and 36 may comprise a spring, a coil, a pneumatic device, a hydraulic device, an energy storage device, and/or another type of device for moving/driving the moving surface 23 along the track 22, and/or for absorbing/storing energy created by forced movement of the moving surface 23 by the faster moving first vehicle 12 or second air vehicle 14. In still other embodiments, the moving surface 23 may be moved and/or create energy to be stored in varying ways using a variety of differing shaped, sizes, and types of devices.

Another moving surface 38 may be disposed within the interior cavity 32 of the first vehicle 12 adjacent the third position 31. The moveable recovery member 18 may be adapted to move one or more of the second air vehicles 14 from the first position 26 to the third position 31, to dispose the one or more second air vehicles 14 into one or more cradle members 42, and to detach from the second air vehicle 14.

The moving surface 38 may comprise a belt, a chain, and/or another type of moving surface. The moving surface 38 may be disposed within a second u-shaped, open track 40 forming another loop. In other embodiments, the moving surface 38 may be disposed within and/or against varying types of structures. The moving surface 38 may be driven around the track 40 by third and/or fourth devices 44 and 46 comprising a motor, a spring, a coil, a pneumatic device, a hydraulic device, or other type of device. The one or more cradle members 42 may be fixedly attached to the moving surface 38 so that the cradle members 42 move with the moving surface 38 around the loop of the track 40.

The cradle members 42 may be further adapted to recharge or refuel second air vehicles 14 being held within the cradle members 42 to provide energy/fuel for the second air vehicles 14 to fly if released from the first vehicle 12. A launch/release hatch 48 in a bottom surface 50 of the first vehicle 12 may be disposed adjacent a portion 52 of the moving surface 38. The cradle members 42 may be adapted to move around the loop of the track 40 and to release the second air vehicles 14 out of the launch/release hatch 48 of the first vehicle 12 in order to re-fly the second air vehicles 14. The launch/release hatch 48 may be adapted to intermittently open and close. Alternatively, the second air vehicles 14 could be redeployed back outside the first vehicle 12 by lifting and/or flying them back into the air-stream through the recovery hatch 30.

Figure 5:
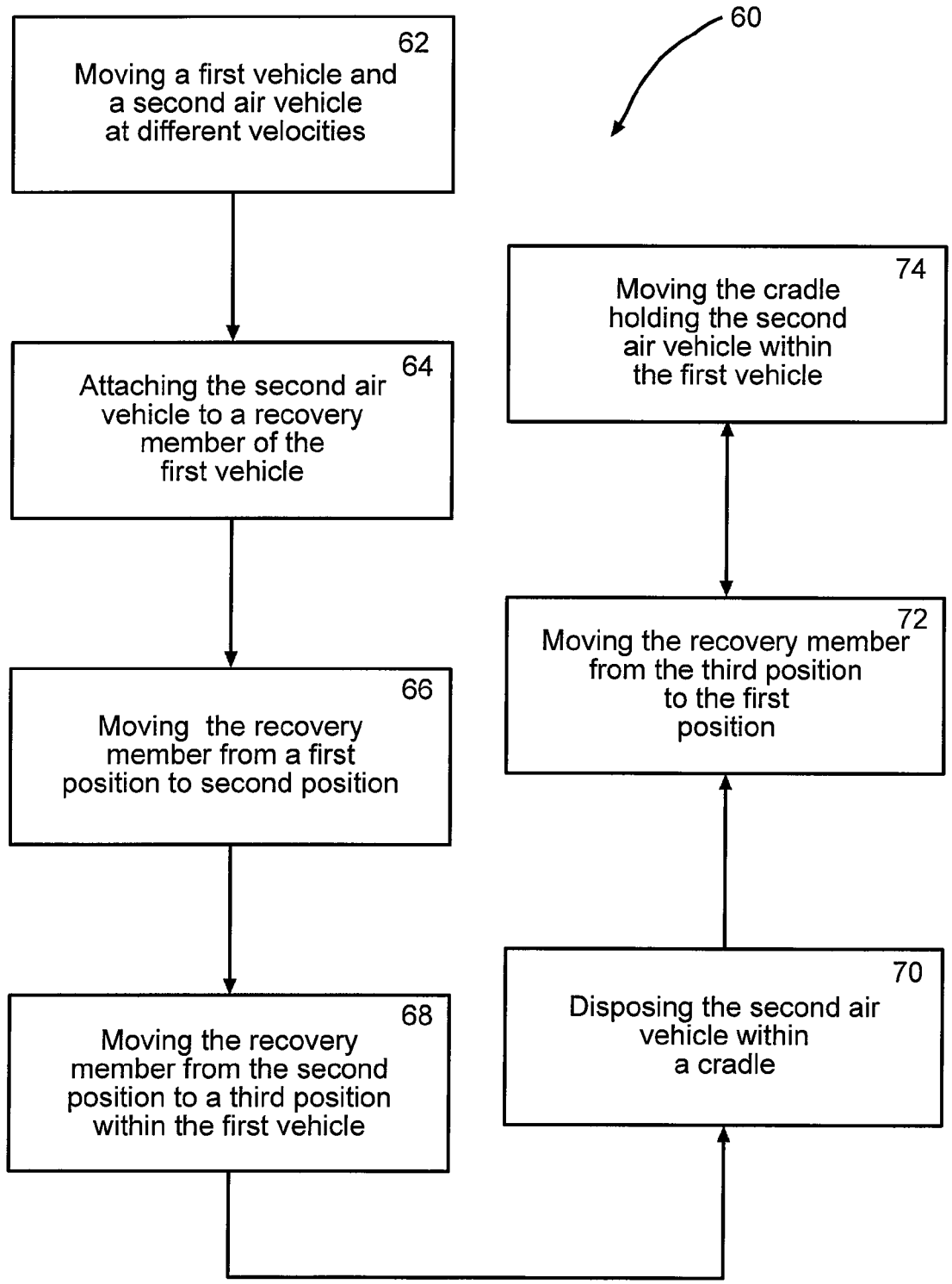
FIG. 5 shows a flowchart of one embodiment of a method of a first vehicle recovering a second air vehicle in flight.

FIG. 5 shows a flowchart of one embodiment of a method 60 of a first vehicle 12 recovering a second air vehicle 14 in flight. In one step 62, as shown in the embodiment of FIG. 2, the first vehicle 12 and the second air vehicle 14 may be traveling at different velocities. The first vehicle 12 and the second air vehicle 14 may be traveling in the same direction with one of the first vehicle 12 and the second air vehicle 14 overtaking the other air vehicle. In other embodiments, the first vehicle 12 and the second air vehicle 14 may be traveling in varying directions such as towards one another. One or more of the first vehicle 12 and the second air vehicle 14 may be unmanned. In other embodiments, neither of the first vehicle 12 and the second air vehicle 14 may be unmanned.

Figure 6:
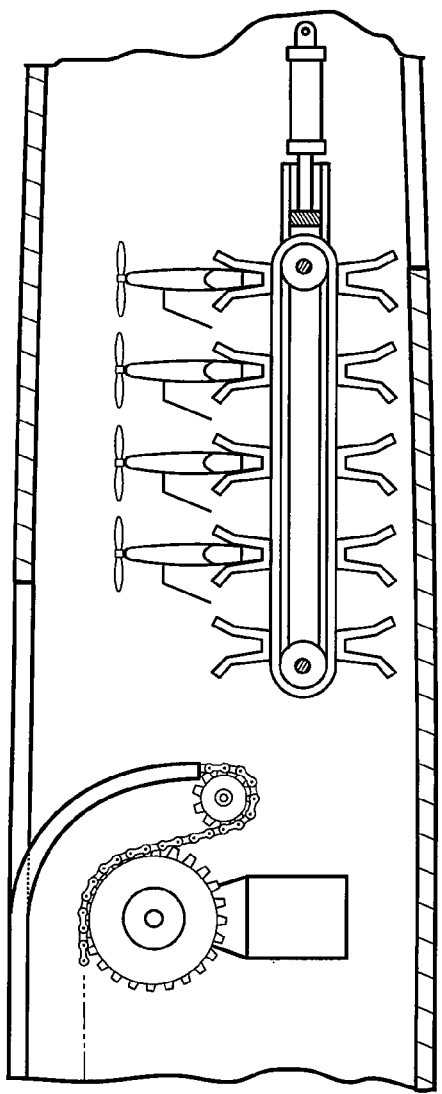
FIG. 6 shows a partial cut-away side view of the system of FIG. 2 with an attachment member of the second air vehicle attached to a recovery member of the first vehicle while the first vehicle and the second air vehicle are traveling at different velocities.
Figure 6:
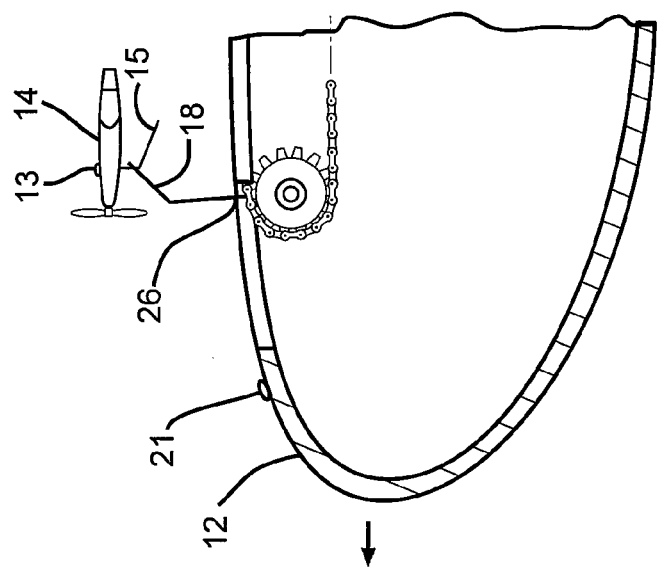

In step 64, the second air vehicle 14 may attach to a recovery member 18 of the first vehicle 12 while the first vehicle 12 and the second air vehicle 14 may be traveling at different velocities. One or more sensors 13A and 21 of the second air vehicle 14 and the first vehicle 12 may have been used to align the attachment member 15 with the moveable recovery member 18 so that they may attach to one another. One embodiment of step 64 is shown in FIG. 6 which shows a partial cut-away side view of the system of FIG. 2 with an attachment member 15 of the second air vehicle 14 attaching to the recovery member 18 of the first vehicle 12 while the first vehicle 12 and the second air vehicle 14 are moving at different velocities. The attachment member 15 may comprise a hook which latches onto a recovery member 18 comprising a trapeze-shaped member, a v-shaped member, a u-shaped member, a looped-shaped member, or other-shaped member. In other embodiments, varying types of attachment members 15 and recovery members 18 may be utilized.

Figure 7:
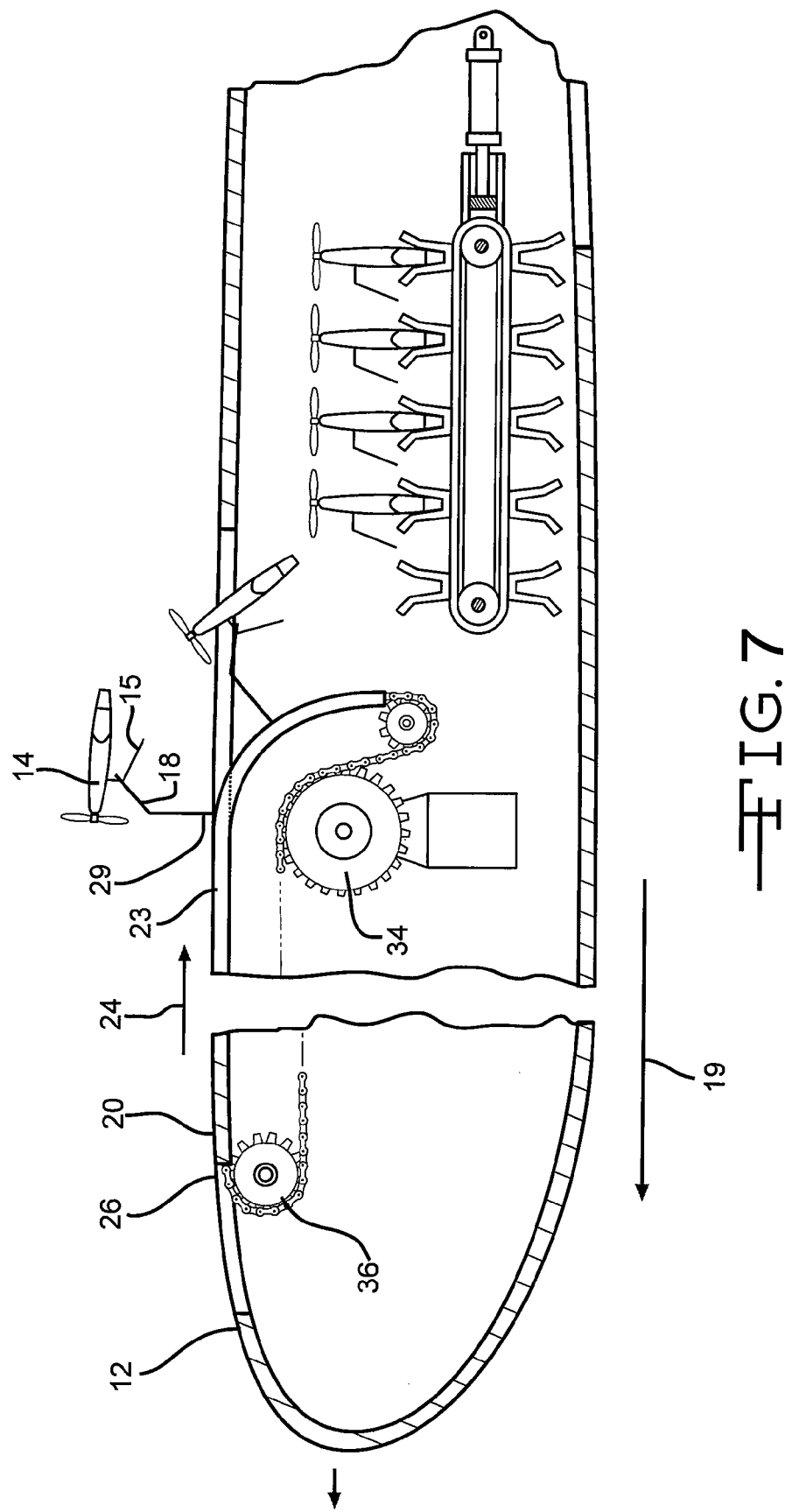
FIG. 7 shows a partial cut-away side view of the system of FIG. 6 with the recovery member attached to the second air vehicle having moved relative to and along an exterior surface of the first vehicle.

In step 66, the recovery member 18 attached to the second air vehicle 14 may be moved relative to and along an exterior surface 20 of the first vehicle 12 from a first position 26 to a second position 29 in a direction 24 substantially parallel to a direction 19 of travel of the first vehicle 12. The recovery member 18 may be attached to a moving surface 23 which may be moved in order to move the recovery member 18 from the first position 26 to the second position 29. One embodiment of step 66 is shown in FIG. 7, which shows a partial cut-away side view of the system of FIG. 6 with the recovery member 18 attached to the second air vehicle 14 having moved relative to and along the exterior surface 20 of the first vehicle from a first position 26 to the second position 29 in the direction 24 substantially parallel to the direction 19 of travel of the first vehicle 12. The faster moving of the first vehicle 12 and the second air vehicle 14 may drive/force the recovery member 18 to move from the first position 26 to the second position 29 without the assistance of a motor. One or more of a first and/or second device 34 and/or 36, comprising without limitation one or more of a motor, a generator, a spring, a coil, a pneumatic device, a hydraulic device, an energy storage device, and/or another type of device, may store energy as the recovery member 18 moves from the first position 26 to the second position 29. In such manner, the deceleration energy of the second air vehicle 14 may be stored for later re-use.

Figure 8:
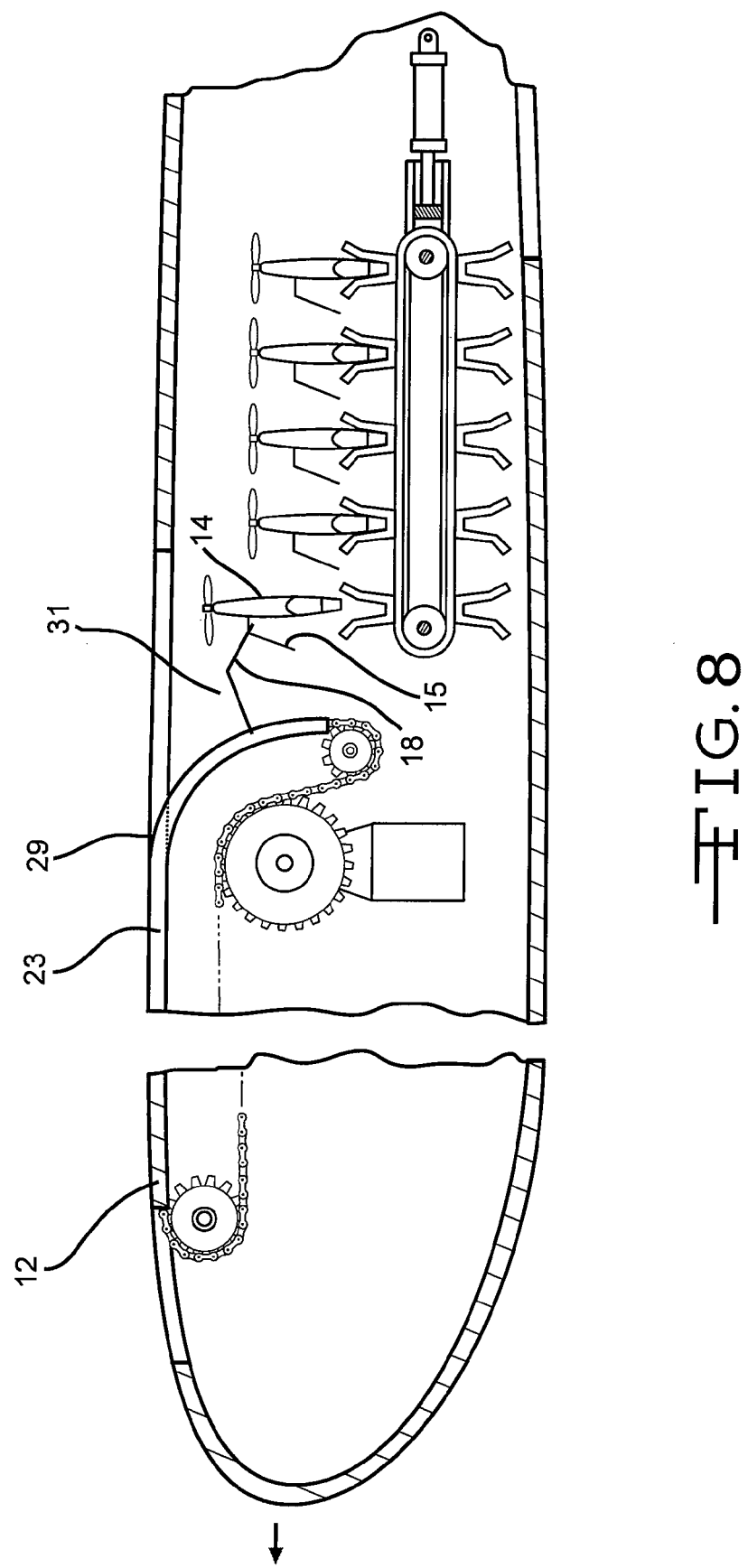
FIG. 8 shows a partial cut-away side view of the system of FIG. 7 with the recovery member attached to the second air vehicle having moved within the first vehicle.

In step 68, the recovery member 18 attached to the second air vehicle 14 may be moved from the second position 29 to a third position 31 within the first vehicle 12. One embodiment of step 68 is shown in FIG. 8 which shows a partial cut-away side view of the system of FIG. 7 with the recovery member 18 attached to the second air vehicle 14 having been moved from the second position 29 to the third position 31 within the first vehicle 12. The moving surface 23 attached to the recovery member 18 may be moved in order to move the recovery member 18 from the second position 29 to the third position 31.

Figure 9:
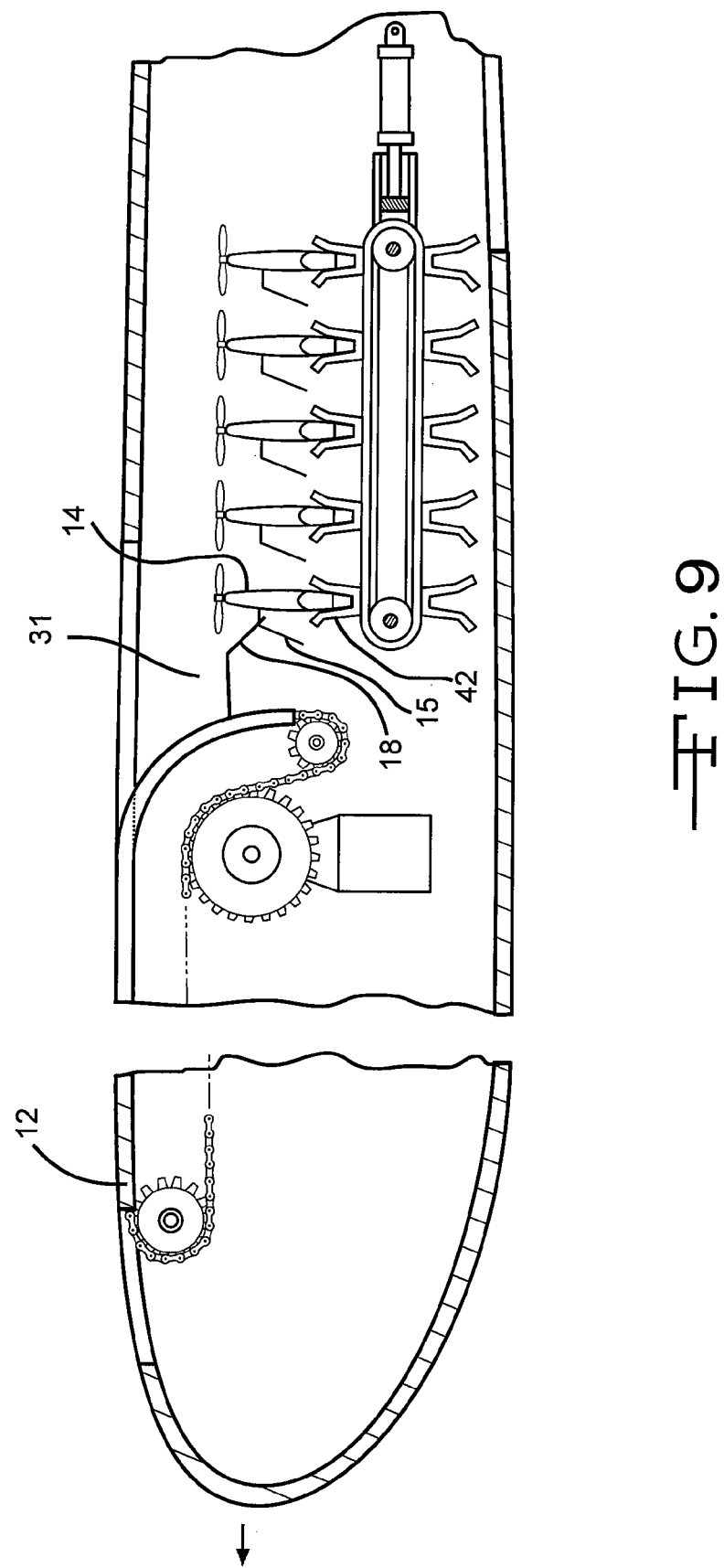
FIG. 9 shows a partial cut-away side view of the system of FIG. 8 with the recovery member having disposed the second air vehicle within a cradle.

In step 70, the recovery member 18 positioned at the third position 31 may dispose the second air vehicle 14 within a cradle 42. The recovery member 18 may subsequently detach from the second air vehicle 14. The cradle 42 may recharge and/or refuel the second air vehicle 14 so that it may fly again. One embodiment of step 70 is shown in FIG. 9 which shows a partial cut-away side view of the system of FIG. 8 with the recovery member 18 positioned at the third position 31 having disposed the second air vehicle 14 within the cradle 42.

Figure 10:
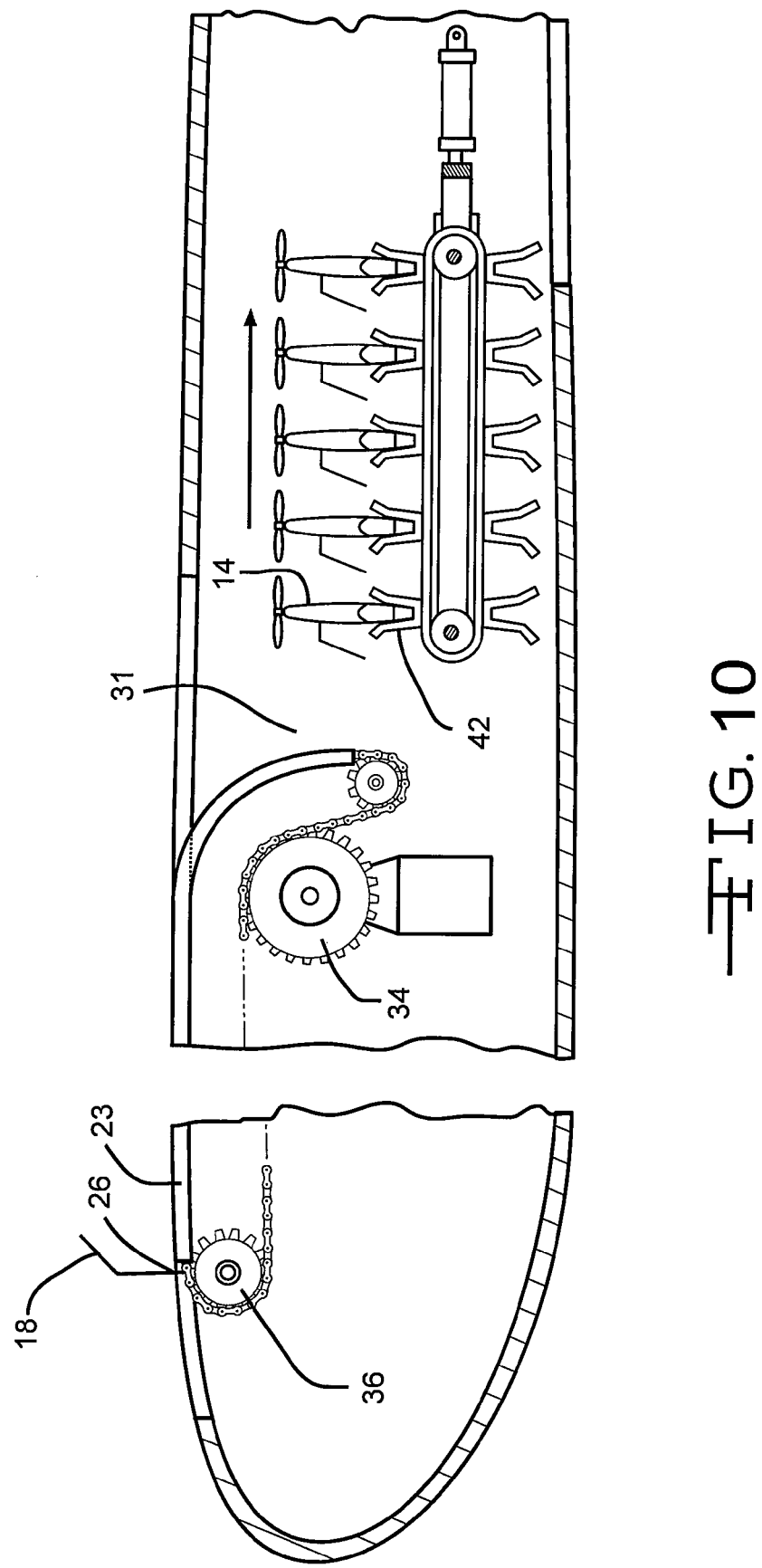
FIG. 10 shows a partial cut-away side view of the system of FIG. 9 with the recovery member having moved back outside the exterior surface of the first vehicle.

In step 72, after having disposed of the second air vehicle 14 within the cradle 42, the recovery member 18 may be moved from the third position 31 to the first position 26. Step 72 may be achieved using a first and/or second device 34 and 36 driving device which may drive the recovery member 18 from the third position 31 to the first position 26 using energy and/or stored energy which may have been stored during step 66. The first and/or second device 34 and/or 36 may comprise without limitation one or more of a motor, a generator, a spring, a coil, a pneumatic device, a hydraulic device, an energy storage device, and/or another type of device. One embodiment of step 72 is shown in FIG. 10 which shows a partial cut-away side view of the system of FIG. 9 with the recovery member 18 having been moved from the third position 31 to the first position 26 after the second air vehicle 14 was disposed within the cradle 42. The moving surface 23 attached to the recovery member 18 may be moved using the first and/or second devices 34 and/or 36 in order to move the recovery member 18 from the third position 31 to the first position 26.

Figure 11:
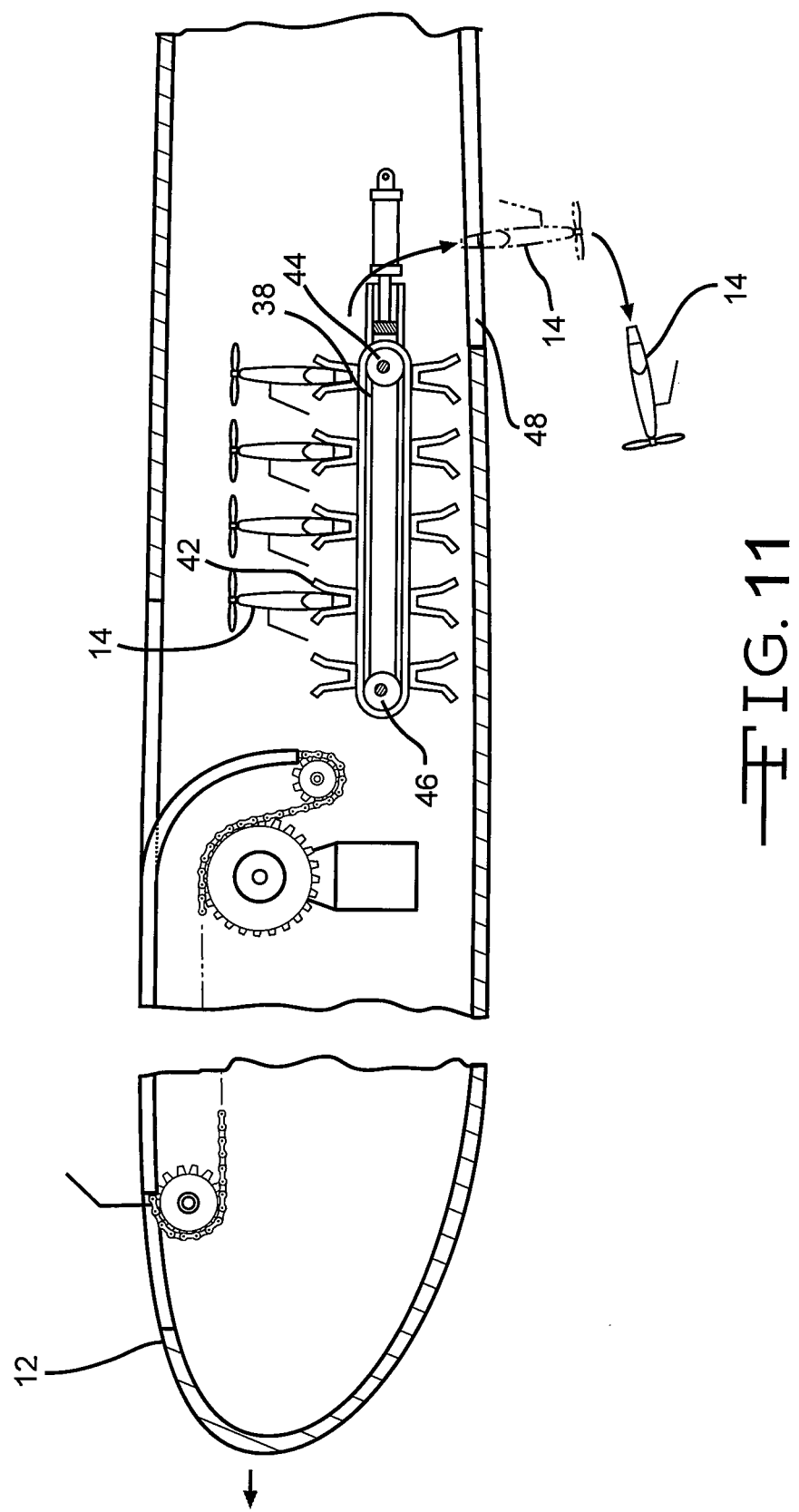
FIG. 11 shows a partial cut-away side view of the system of FIG. 10 with the cradle holding the second air vehicle having moved, the cradle having recharged and/or refueled the second air vehicle, and the second air vehicle exiting the first vehicle through a hatch.

In step 74, the cradle 42 holding the second air vehicle 14 may be moved, and/or the second air vehicle 14, which may have been recharged and/or refueled using the cradle 42, may exit the first vehicle 12 through an open launch hatch 48 to fly again. One embodiment of step 74 is shown in FIG. 11 which shows a partial cut-away side view of the system of FIG. 10 with the cradle 42 holding the second air vehicle 14 having been moved, the cradle 42 having recharged and/or refueled the second air vehicle 14, and another second air vehicle 14 exiting the first vehicle 12 through the open launch hatch 48 to fly again. A moving surface 38 attached to the cradle 42 may have been moved in order to move the cradle 42. The moving surface 38 may have been driven by third and/or fourth devices 44 and/or 46 comprising a motor, a spring, a coil, a pneumatic device, a hydraulic device, or other type of device.

One or more embodiments of the disclosure may allow for the recovery of a second air vehicle in flight by a first vehicle while the vehicles are traveling at different velocities. The varying velocities of the vehicles may allow for the deceleration energy of the second air vehicle to be stored for later re-use. The length of the track may allow the second air vehicle to be recovered without damage. The second air vehicle may be disposed within the first vehicle in order to reduce drag, and may be moved within the first vehicle in order to avoid interfering with the launch of additional second air vehicles. The recovered second air vehicle may be recharged and/or refueled within the first vehicle in order to re-fly again.

It should be understood, of course, that the foregoing relates to exemplary embodiments of the disclosure and that modifications may be made without departing from the spirit and scope of the disclosure as set forth in the following claims.

The invention claimed is:

1. A method of a first air vehicle recovering a second air vehicle in flight comprising:
    moving the first air vehicle and the second air vehicle at different velocities;
    attaching the second air vehicle to a recovery member of the first air vehicle while the first air vehicle and the second air vehicle are traveling at different velocities; and
    moving the recovery member attached to the second air vehicle relative to and along a top exterior surface of the first air vehicle from a first position to a second position in a direction substantially parallel to a direction of travel of the first air vehicle.

2. The method of claim 1 wherein at least one of the first air vehicle and the second air vehicle is unmanned.

3. The method of claim 1 wherein the attaching step further comprises attaching an attachment member of the second air vehicle to the recovery member of the first air vehicle while the first air vehicle and the second air vehicle are traveling at different velocities.

4. The method of claim 3 wherein the attachment member comprises a hook and the recovery member comprise at least one of a trapeze-shaped member, a v-shaped member, a u-shaped member, and a looped-shaped member.

5. The method of claim 1 further comprising the step of moving the recovery member from a third position to the first position using at least one of a motor, a generator, a spring, a coil, a pneumatic device, a hydraulic device, and an energy storage device.

6. The method of claim 1 wherein the moving the recovery member attached to the second air vehicle relative to and along the top exterior surface of the first air vehicle from the first position to the second position in the direction substantially parallel to the direction of travel of the first air vehicle further comprises whichever of the first air vehicle and the second air vehicle are traveling faster moving the recovery member from the first position to the second position.

7. The method of claim 6 further comprising at least one of a motor, a generator, a spring, a coil, a pneumatic device, a hydraulic device, and an energy storage device storing energy as the recovery member moves from the first position to the second position.

8. The method of claim 1 further comprising the step of moving the recovery member attached to the second air vehicle from the second position to a third position within the first air vehicle.

9. The method of claim 8 further comprising the step of the recovery member disposing the second air vehicle in a cradle and detaching from the second air vehicle.

10. The method of claim 9 further comprising the step of moving the cradle holding the second air vehicle within the first air vehicle.

11. The method of claim 10 further comprising the step of recharging or refueling the second air vehicle.

12. The method of claim 11 further comprising the step of the recharged or refueled second air vehicle exiting the first air vehicle and flying again.

13. The method of claim 10 wherein the step of moving the cradle further comprises moving a moving surface attached to the cradle.

14. The method of claim 1 wherein moving the recovery member further comprises moving a moving surface attached to the recovery member.

15. The method of claim 1 wherein the first air vehicle comprises at least one of an aircraft, a ground vehicle, and a ship.

16. A method of a first air vehicle recovering a second air vehicle in flight comprising:
    attaching the second air vehicle to a recovery member of the first air vehicle while the first air vehicle and the second air vehicle are traveling in different directions; and
    moving the recovery member attached to the second air vehicle relative to and along a top exterior surface of the first air vehicle from a first position to a second position in a direction substantially parallel to a direction of travel of the first air vehicle.

* * * * *